Patented Oct. 16, 1951

2,571,541

UNITED STATES PATENT OFFICE 2,571,541

HIGH DEXTRIN DEXTROSE PROCESS

James Edwin Cleland and Alvin Le Roy Meyer, Granite City, Ill., assignors to Union Starch & Refining Company, Columbus, Ind., a corporation of Indiana No Drawing. Application June 21, 1945,
Serial No. 600,840

3 Claims. (Cl. 127—40)

This invention relates to the production of a syrup from starch by a process of dual hydrolysis and more specifically to the production of a type of syrup in which the carbohydrates of relatively large molecular size such as dextrine, the polymers of maltose, commonly known as higher sugars, and maltose predominate and in which the monosaccharide, dextrose, is a minor constituent.

The main object of this invention is to so hydrolyze a starch such as corn starch that a stable syrup of relatively low dextrose equivalent is is produced and a carbohydrate composition is produced which possesses to a very high degree the well known nutritional advantages characteristic of carbohydrate mixtures which primarily comprise the longer chain components such as dextrin and compounds related to dextrin.

It is widely recognized that the hydrolysis products of starch in which the dextrins predominate have particular advantages in the nutritional field and particularly as carbohydrate supplements for milk in infant feeding. An extensive literature has been built up on this subject with contributions from outstanding nutritional experts and pediatricians. According to the work of Rettger, for instance, the dextrins afford a favorable medium for the growth of Lactobacillus acidophilus in the intestinal tract (L. F. Rettger et al., Lactobacillus acidophilus, Therapeutic Application, Yale University Press, New Haven, 1935). See also R. Rogers et al., 1935; A. P. Matthers, Physiological Chemistry; H. C. Sherman "Chemistry of Food and Nutrition," pages 20 and 111, 1937.

It has been demonstrated through much careful investigation that the dextrines have a number of advantages which make them desirable in the digestive system both of the normal infant and of persons of all ages where there is digestive disorder, inflammation, critical delicacy or other deviation from normalcy.

In addition to these general favorable indications, there is another very important feature with the dextrines which arises from the fact that they are absorbed slowly in the digestive system and there is comparatively little chance of fermentation.

For example, it is stated in "Practical Infant Feeding" by Louis Webb Hill, 1922, page 322. "On account of the different degrees of rapidity with which dextrine, maltose and dextrose are absorbed there is comparatively little change of fermentation and therefore corn syrup makes a very valuable addition to the diet and may be used in suitable cases in large amounts."

Also to quote Marriott and Davidson, Journal of the American Medical Association, December 15, 1923, "The carbohydrate of choice is commercial corn syrup such as is obtainable in grocery stores which contains a relatively high proportion of dextrines which do not ferment readily and can consequently be added to the feed of children in large amounts without danger of producing diarrhea."

There are numerous additional references to the nutritional value and digestive advantages of corn syrup in the literature concerned with children's diseases and in the results reported of various physiological experiments.

Corn syrup has been universally accepted by the medical profession as a desirable food for infants and it is widely used for this purpose by physicians and pediatricians. It is recognized however that corn syrup of very low dextrose equivalent is the most desirable type for the purposes above referred to.

The normal commercial corn syrup has a dextrose equivalent of about 42. The dextrose equivalent desired to obtain maximum nutritional advantage for this special purpose syrup as set forth above should be considerably less, namely about 26 to 38.

There are practical obstacles in the manufacture of such syrups of very low dextrose equivalent and there have been no means hitherto of overcoming these. Perhaps the most troublesome has been the tendency of these syrups towards instability which results in the precipitation of the dextrines making the product unsuitable because no longer homogeneous, less soluble and of unfavorable appearance generally.

As a result there has been widespread use of syrups of higher dextrose equivalent and while these undoubtedly are quite useful, they do not have all of the advantages of a low D. E. syrup.

It is the primary object of our invention to provide a method for manufacturing a syrup of very low dextrose equivalent which has a high solubility and in which the dextrines do not precipitate.

It is a further object of the present invention to provide a novel process for making a corn syrup of low dextrose equivalent having new and unusual characteristics.

It is a further object of the present invention to provide a novel low dextrose equivalent syrup of unusual stability.

This purpose is accomplished by a dual hydrolysis a specific example of which may be described as follows:

Starch as from corn is acidified and hydrolyzed in the usual manner with heat and pressure but the hydrolysis is stopped in an earlier stage than in the process normally used. That is, the hydrolysis is stopped when the dextrose equivalent reaches a level of about 16–23 per cent. The hydrolysate is then released to the neutralizer and adjusted to a pH of 4.6 to 5.4. At this stage the hydrolysate is run into a tank in which the temperature of the hydrolysate is maintained in the range of about 100–135° F. An enzymatic preparation is then added in sufficient amount to effect further hydrolysis, principally of the dextrines, so that the dextrose equivalent will be increased to from 26 to 38%. The enzyme preparation employed may be any of widely used commercial products of this type (such as Clarase, Rhozyme(s), etc.), but must predominate in diastatic activity and be powerful enough in this respect to achieve the hydrolysis within a reasonable time which may be from 6–48 hours. The enzymes derived from the fungi of the mold type are suitable for this purpose. It will be noted that the protein coagulum of the acid hydrolyzed syrup need not be removed before the enzymatic hydrolysis. This is a departure from the ordinary practice and would be very detrimental in making an ordinary corn syrup but is an advantage in making the product of our invention. The advantage lies in the fact that most enzymatic preparations that we may use have some proteolytic power and thus the enzyme converts some of the protein to amino acids. These amino acids are desirable from the nutritional standpoint and the practical advantage in manufacture results from the fact that part of the protein coagulum is converted to the desirable amino acids and thus rendered sufficiently soluble by the enzyme action so that they do not interfere with filtration.

The remaining insoluble protein and fats are removed in a skimming device of the type ordinarily used in skimming insolubles formed during the conventional corn syrup manufacture. The syrup is then filtered and refined by bone char or activated carbon by methods well known to those skilled in the art.

After such refining by conventional means the syrup is evaporated in a vacuum pan to a concentration in the range 38 to 43 Bé. (commercial at 100° F.). This would constitute the final process step in the manufacture of ordinary corn syrups but there is further processing required in the making of some of the special syrups of this invention. These steps are novel and are included as part of this invention since they provide further new and desirable results. The additional steps are:

(1) High temperature heat treatments.
(2) Filtration at high concentration and temperature.

These steps may be carried out as follows: The refined syrup which has been concentrated in the range 38 to 43° Bé. is transferred to a tank or pressure kettle which is equipped with a heating device and agitator. Heating and agitation are continued until the temperature of the syrup reaches 180 to 240° F. and it is then filtered by means of any suitable type of filter press. An ordinary plate and frame press using cloth, paper or any other suitable filtration medium may be used by the newer vertical filters which have heating jackets and ample drainage space are preferred.

In a typical and preferred case the refined syrup is concentrated to 40–41° Bé., heated to 220° F., cooled to 180–190° F. and filtered in that temperature range. Higher gravities may be handled at the higher temperatures but it is not often necessary to exceed the preferred limits. Filtration under these conditions has a number of marked advantages among which are:

(1) Any haze or coagulum which may have appeared in the concentration step is removed.
(2) The formation of incipient haze which may appear in corn syrup after long storage is accelerated in the heating step and is removed.
(3) Filtering a syrup at its final concentration has advantages over the conventional filtration at 24–34° Bé. which is followed by evaporation. This is apparent when it is considered that evaporation after filtration tends to accentuate any slight haze which may have escaped the filter and that haze may be formed during concentration.
(4) The syrup made by the high temperature treatment and filtration of this invention is of brilliant clarity and stability quite impossible to attain by conventional methods which avoid filtration at high temperatures and concentrations.

An apparent disadvantage in this process resides in the fact that considerable coloration of the syrup is brought about by this high temperature treatment. This is not a disadvantage, however, but on the contrary is a distinct advantage in a special syrup for nutritional purposes. A very beautiful amber color is produced and provides a distinctive feature which may be utilized as an identifying characteristic of the product.

The heat treatment provides additional advantages in that viscosity is lowered and flavor is improved.

In the preparation of a special nutritional syrup, the type most acceptable as a carbohydrate supplement for infant feeding, a further step is employed in the preferred process of this invention. This consists of an additional heat treatment after filtration and is carried out mainly for the purpose of adjusting the coloration to a uniform standard. The practice which has proven most successful in this step is to heat to 220–250° F. in a jacketed pressure vessel equipped with agitator, hold until the desired degree of coloration is attained and then to cool rapidly to bottling temperature by circulating cold water through the jacket. By this process an absolutely sterile product of brilliant clarity and appealing amber coloration of high uniformity may be packed.

Ordinary starch hydrolysis syrups cannot be filtered in commercially practical volume at concentrations of 38–41° Bé. The reason for this is obvious on examination of viscosity-temperature curves for these products. The temperature necessary to bring the viscosity down to practical levels for volume filtration in this concentration range is so high that the syrup develops an undesirably high color.

Hot filtration at a concentration slightly higher (say 41° Bé.) than that required in the finished product (say 40° Bé.) is a valuable feature of this invention as it is added protection against haze development in storage. Filtration at the higher concentration removes all haze developed at that level and subsequent slight dilution before the final heat treatment gives an additional margin of safety in that the concentration of any constituent which may be near saturation and a potential haze former is reduced well below the critical level.

In certain types of commercial syrups made by dual hydrolysis of starch, i. e. by acid plus enzyme hydrolysis, it is considered important to attain a ratio of about 1.0 between the fermentable extract and dextrose equivalent. In fact it is stated often in the literature on the subject that this ratio of 1.0 is an essential condition in order to attain stability or freedom from precipitation and crystallization. Probably the statements are correct for syrups of much higher dextrose equivalent than the products of this invention. The higher dextrose equivalent syrups have total sugar contents which make crystallization a likely probability unless a strict balance is maintained as indicated by the 1.0 ratio.

In the case of the products of this invention, however, the ratio of fermentable extract to dextrose equivalent may be lower than that found in the usual dual conversion syrups of higher dextrose equivalent and the actual figures which the ratio represents are much lower. Ordinarily this ratio will be in the range 0.8-0.95. Examples of satisfactory products are:

| Per Cent F. E. | D. E. | F. E./D. E. |
| --- | --- | --- |
| 33.4 | 34.74 | 0.96 |
| 30.9 | 35.54 | 0.87 |
| 23.6 | 27.96 | 0.84 |

A minimum total sugars content is aimed at in some of the products of this invention and a maximum of dextrins together with the compounds of large molecular size related to dextrins.

The reason for lack of stability in the low dextrose equivalent products is found at the opposite end of the scale, i. e., in the danger of precipitation of dextrines rather than sugars. Hence the dextrines must be rendered soluble and stable and this is accomplished by permitting a suitable enzyme preparation to work just long enough to clarify and stabilize without contributing too substantially to the total sugars. The novel heat treatment and hot filtration applied as final steps finish the clarification and help to provide the desired stability.

Hence by the process of this invention it is possible to make very useful and nutritionally superior products by hydrolyzing starch with acid to less than 25 dextrose equivalent followed by enzymatic hydrolysis to any dextrose equivalent within the range attainable by the enzyme preparation used. It is a notable fact that this procedure has been ignored hitherto and that the feature of hydrolyzing with acid to under 25 dextrose equivalent followed by enzymatic hydrolysis has been specifically excluded in at least one patent on dual starch hydrolysis, as worthless. Apparently the failure to recognize the advantage in this procedure resulted from unfamiliarity with the possibilities of high temperature filtration of concentrated carbohydrate syrups or failure to recognize the nutritional advantages of the low dextrose equivalent products.

It will be understood that starches other than from corn may be employed, for example from potatoes and other common plants. Further, although for the purposes of obtaining the desirable nutritional supplement here described, we prefer a D. E. of about 26 to 32 and not more than 38, the process of our invention includes an enzymatic conversion to even higher D. E.'s such as 40 to 45 after original acid hydrolysis to low D. E. since we still may thus obtain desirable features for other uses by our process here described. Among these features is a very low viscosity which is a useful property in handling, mixing, processing, etc.

We claim:

1. A method of producing a clear, stable corn syrup which comprises the steps of hydrolyzing a starch containing protein and oil as impurities by acid and heat to a dextrose equivalent of about 16 to 24 and then without removing the precipitated protein and oil hydrolyzing the partially hydrolyzed syrup by a diastatic enzyme preparation to a D. E. of about 26 to 40, whereby a portion of the proteins are also hydrolyzed to soluble amino acids, removing the insoluble fats and proteins which remain and refining the syrup, evaporating the syrup to about 38–43° Bé., heating to about 180–240° F., filtering the hot liquor, heat treating the filtered liquor at a temperature of 180–240° F. until the desired amber coloration is achieved.

2. A method of producing a clear and stable syrup which comprises hydrolyzing a starch to a relatively low dextrose equivalent of 16–24, then hydrolyzing by means of a diastatic enzyme the partially hydrolyzed syrup so formed to a relatively higher dextrose equivalent of 26–40, concentrating the syrup so formed to about 38 to 43° Bé., heating the syrup to about 180 to 240° F., and filtering the hot syrup.

3. A method of producing a clear and stable syrup which comprises hydrolyzing a starch to a relatively low dextrose equivalent of 16–24, then hydrolyzing by means of a diastatic enzyme the partially hydrolyzed syrup so formed to a relatively higher dextrose equivalent of 26–40, concentrating the syrup so formed to about 38 to 43° Bé., heating the syrup to about 180 to 240° F., filtering the hot syrup, and heating the syrup after filtration at a temperature of about 180 to 240° F. until an amber coloration is obtained.

JAMES EDWIN CLELAND.
ALVIN LE ROY MEYER.

REFERENCES CITED

The following references are of record in the file of this patent:

UNITED STATES PATENTS

| Number | Name | Date |
| --- | --- | --- |
| 61,898 | Van Wyck | Feb. 5, 1867 |
| 256,835 | Hamlin | Apr. 25, 1882 |
| 916,683 | Duryea | Mar. 30, 1909 |
| 2,054,873 | Whitby | Sept. 22, 1936 |
| 2,149,517 | Fleming | May 7, 1939 |
| 2,201,609 | Dale | May 21, 1940 |
| 2,305,168 | Langlois | Dec. 15, 1942 |
| 2,410,264 | Brock et al. | Oct. 29, 1946 |

FOREIGN PATENTS

| Number | Country | Date |
| --- | --- | --- |
| 411,308 | Great Britain | June 7, 1934 |
| 419,248 | Great Britain | Nov. 8, 1934 |
| 803,298 | France | of 1936 |
| 817,899 | France | of 1938 |